May 15, 1951  J. VARGO  2,552,656

COLLAPSIBLE BABY CARRIAGE

Filed Dec. 2, 1948  3 Sheets-Sheet 1

INVENTOR
JOHN VARGO
BY
Altsch & Knoblock
ATTORNEYS

May 15, 1951  J. VARGO  2,552,656
COLLAPSIBLE BABY CARRIAGE
Filed Dec. 2, 1948  3 Sheets-Sheet 3

INVENTOR
JOHN VARGO
BY
Oltsch & Knoblock
ATTORNEYS

Patented May 15, 1951

2,552,656

UNITED STATES PATENT OFFICE 2,552,656

COLLAPSIBLE BABY CARRIAGE

John Vargo, Mishawaka, Ind.

Application December 2, 1948, Serial No. 63,005

5 Claims. (Cl. 280—37)

This invention relates to improvements in collapsible baby carriages.

The primary object of the invention is to provide a device of this character which can be used either as a portable container or as a baby carriage having wheels, a handle and a top, wherein said wheels, handle and top are withdrawn to concealed position relative to the body portion, when collapsed to serve as a container, without materially interfering with or reducing the storage capacity of the body portion.

A further object is to provide a device of this character having a rigid body or cab portion mounting a foldable wheel-carrying structure shiftable between an operative position and a collapsed position under the control of a pivoted handle, wherein the handle is positioned within the outline of the cab in its collapsed position, and the wheel-carrying structure and the wheels carried thereby are positioned within sockets in the side walls of the cab portion in said collapsed position.

A further object is to provide a device of this character with a body or cab portion having side walls of hollow construction, each side wall receiving a wheel mounting structure, including a pair of members pivoted to the body, wheels journaled to said members, and a connecting structure, said body mounting a handle carried by a rock shaft spanning the interior of the body at one end and having crank end portions to which said connecting structures are pivoted and which are adapted to be engaged by latches carried by said body portion.

Other objects will be apparent from the following specification.

Figure 1:
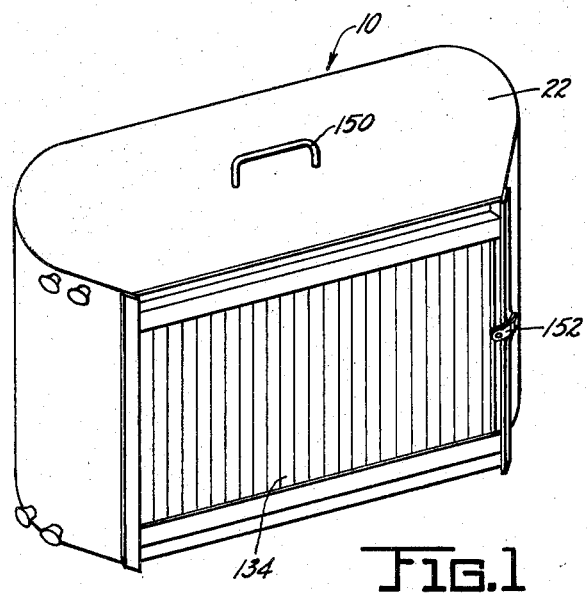
Fig. 1 is a perspective view of the device in its collapsed position.
Figure 2:
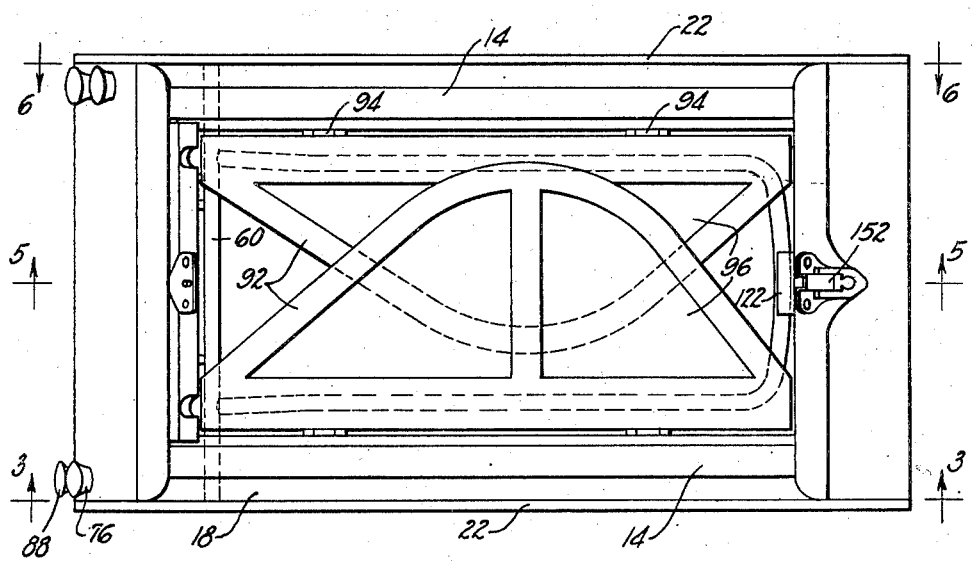
Fig. 2 is a top plan view of the device with the cover thereof removed.

Referring to the drawings which illustrate the preferred embodiment of the invention, the numeral 10 designates a body or cab member having a bottom 12, sides 14 and ends 16. The top of the body is open. Each of the sides 14 has an exterior socketed face defined by a marginal flange 18 extending around the top and ends thereof and a spacer 20 formed at the central portion of the bottom thereof. The socket is thus open at its bottom edges between the ends of the flanges 18 and the spacer 20. Cover panels 22 are adapted to be secured to the flange 18 and spacer 20 at each side of the device to enclose the sockets and to cooperate with the parts 14, 18 and 20 to provide hollow side walls. This body may be formed of any suitable material, such as wood, metal or plastic material.

Each of the side panels 14 has pivoted thereto, as by means of studs 24 fixedly secured to said side walls, a front bellcrank member 26 and a rear bellcrank member 28. These bellcrank members are rigid and lie parallel to side panels 14 and are free to shift or pivot within the socket formed in the hollow side walls. At one end of each bellcrank, and preferably at an offset portion thereof, is mounted a laterally projecting stud 30. Each of these studs journals a wheel, such as a front wheel 32 or a rear wheel 34, and any suitable bearing structure may be provided to journal and provide free rotation of the wheels upon their mounting studs.

The end of each bellcrank 26 opposite that which mounts a wheel 32 carries a laterally projecting stud 36. This stud is mounted slidably within an elongated slot 38 formed in the forward end of a rigid member 40 extending generally longitudinally in the wall socket and freely shiftable therein. The rear end portion of the member 40 preferably comprises a curved or gooseneck portion 42. At an intermediate point upon the gooseneck portion 42 is mounted a projecting member 44, and a coil spring 46 is carried at its opposite ends by the projection 44 and the stud 36, whereby the front bellcrank 26 is urged to a position with its stud 36 engaging the rear end of the elongated slot 38.

The upper or inner end of each of the rear bellcranks 28 mounts a laterally projecting stud 48 which fits within and is freely slidable within an elongated slot 50 mounted in a rigid elongated member 52 extending generally longitudinally within the socket of each side wall and freely shiftable therein. Each of the members 52 includes an upwardly projecting rigid end portion 54 which is pivotally connected at 56 to the rear end of the curved portion 42 of the member 40.

A handle member 58, preferably of generally U-shaped form with its side runs spaced apart a distance less than the spacing between the side panels 14, and of a length less than the longitudinal dimension of the interior cavity of the container 10, is fixedly secured upon a cross-shaft 60 which extends between the side walls 14 adjacent one end of the body 10 and within the cavity thereof and preferably at a level intermediate the bottom edges of said side walls. The ends of the cross-shaft 60 project into the hollow sockets, and the end portions rigidly mount crank members 62 within the side wall sockets and freely shiftable therein. The rear end portion of each member 52 is preferably curved at 64, and the cranks 62 are likewise preferably curved. The free ends of the cranks 62 are pivoted to the ends of the curved portions 64 of the members 52 by pivot pins 66. An elongated coil spring 68 is connected at one end to the pivot pins 66, and at the other end to the stud 48 and thus serves normally to urge each rear bellcrank to a position with its stud 48 at the rear end of the slot 50. Each of the crank members 62 also carries a rigid tongue 70.

Figure 3:
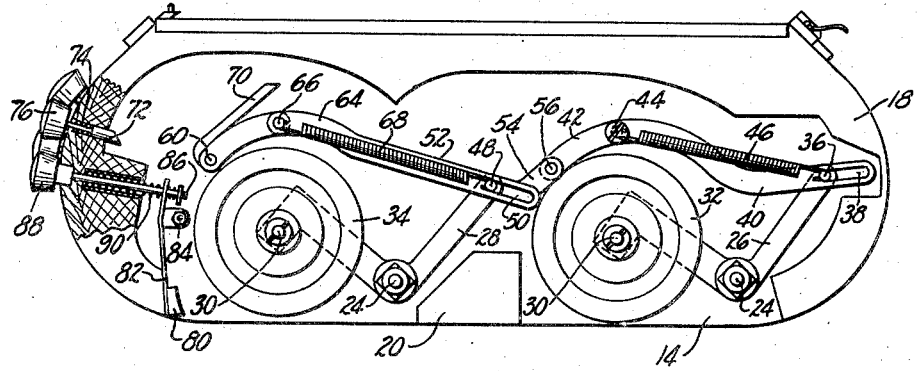
Fig. 3 is a view taken on line 3—3 of Fig. 2, with the outer side panel of the body removed and illustrating the wheel structure in its collapsed position.
Figure 5:
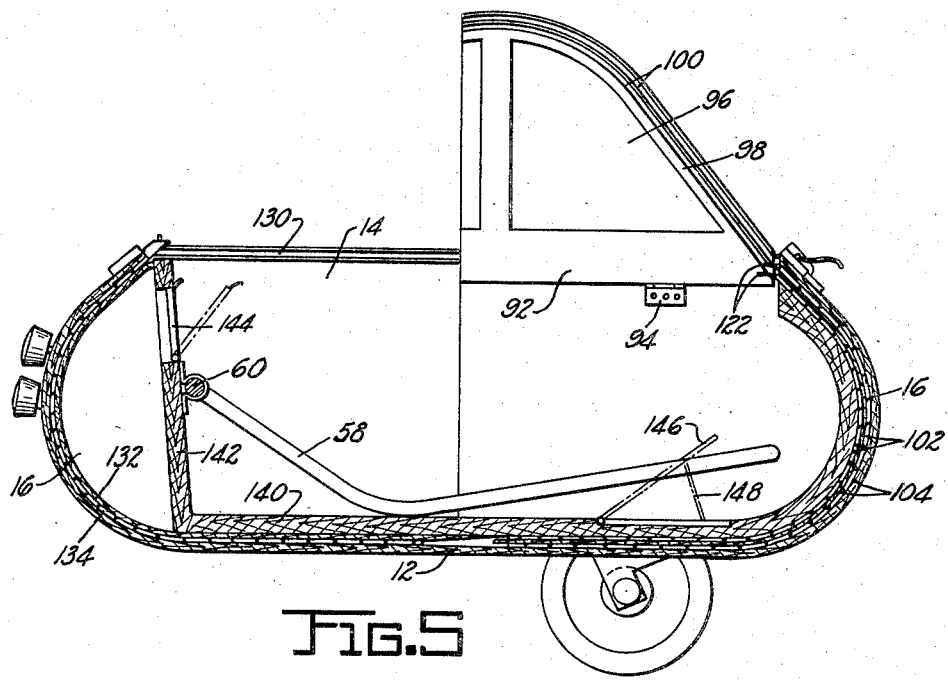
Fig. 5 is a longitudinal sectional view taken on line 5—5 of Fig. 2 and illustrating the superstructure in erected position in part.
Figure 6:
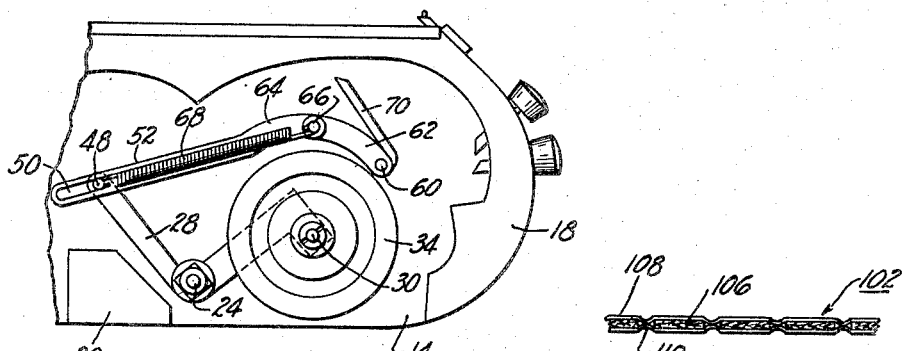
Fig. 6 is a fragmentary view taken on line 6—6 of Fig. 2.

The collapsed position of the wheel-supporting structure is illustrated in Fig. 3, in which it will be seen that the cranks 62 are positioned forwardly relative to their pivot axes and have been shifted to a forwardly projecting position relative to the cross-shaft 60, and in this position have urged the members 52 and 40 longitudinally within the sockets or cavities of the side walls. The longitudinal movement of the members 52 and 40 has served to pivot the bellcranks 26 and 28 about their stud axes 24 and to a position raising the wheel mounting portions of said bellcranks sufficient to withdraw the wheels 32 and 34 completely into the hollow cavities within the side walls. In this position of the handle it fits within the body and preferably rests against the bottom of the body 10, as shown in Fig. 5. Note in this connection that in the collapsed position of the parts, the curved portion 42 fits around the wheels 32, and the curved crank 62 is so positioned relative to the curved end 64 of the member 52 as to define a generally arcuate structure fitting freely around the wheels 34. Thus the connecting structure constituting the members 40 and 52 does not interfere with the retraction of the wheels and permits the reduction to a minimum of the width of the socket or cavity in each side wall.

Figure 4:
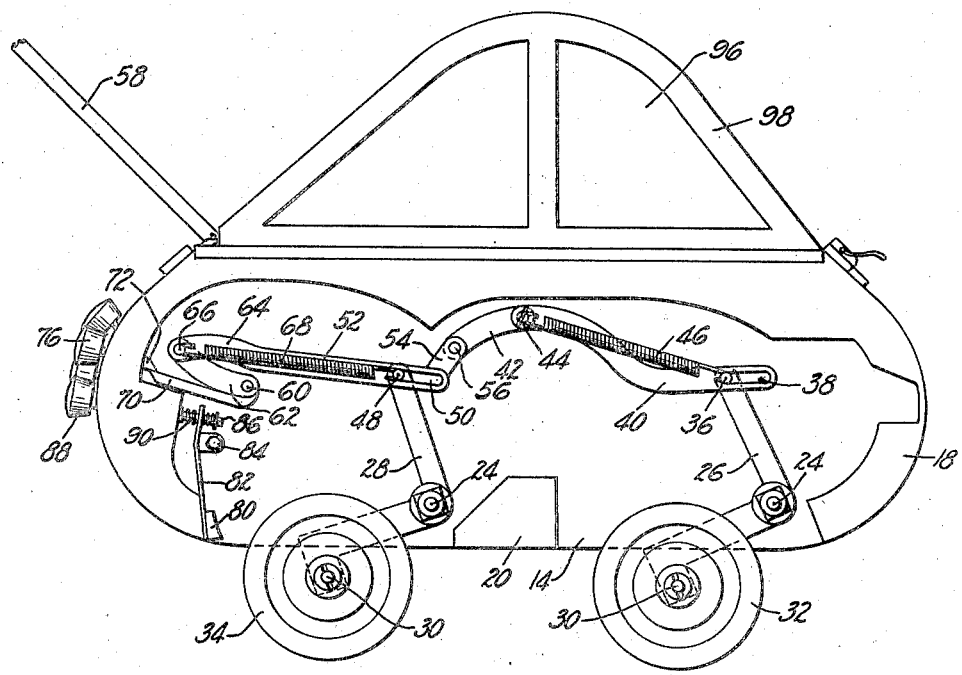
Fig. 4 is a view similar to Fig. 3, illustrating the wheel structure in its extended position and the superstructure extended.

When the carriage is to be erected to the position illustrated in Fig. 4, the handle 58 is grasped and swung to the rearwardly upwardly extending position shown in Fig. 4, thereby swinging the cranks rearwardly and drawing the connecting structure 40, 52 rearwardly so as to pivot the bellcranks 26 and 28 in a manner to cause the wheels 32 and 34 to be projected from the body. The body carries one or more latch members 72 in the paths of the tongues 70, the same being slidable in sockets against the action of springs 74 and mounting handles 76 at their outer ends. Thus, as illustrated in Fig. 4, when the carriage is erected, the tongues 70 will be engaged by one or more of the latches 72 and the whole unit will be held erect. Consequently, before the carriage can be collapsed thereafter, it is necessary to pull outwardly upon a handle 76 of each of the one or more latches 72 which engage the tongues 70.

Observe that in its erected position each of the wheels 32 and 34 of the carriage is positioned resiliently. Thus if any one wheel should strike an obstacle, that wheel may shift upwardly to ride over the obstacle and thus reduce to a minimum the jar which is transmitted to the body 10. Thus, if one of the front wheels 32 strikes an obstacle, the bellcrank 26 mounting that wheel is free to swing against the action of the spring 46 to the limit permitted by the length of the slot 38 in which its stud 36 is mounted. Similarly, if one of the rear wheels 34 strikes an obstacle, its bellcrank 26 is free to pivot against the action of the spring 68 to the limit determined by the path of its stud 48 in the slot 50. It will be observed that, except for the cross-shaft 60, no cross member extends through the body 10 of the carriage, and further that the position of the shaft 60 at the end of the interior of the body does not interfere with or reduce the usable space within the carriage. Specifically, attention is directed to the fact that the studs 24 are carried by the individual panels and that no wheel axles or other members connect the wheels at the opposite sides of the carriage to interfere either with full range of movement of the wheels or with the usable interior space of the body 10.

If desired, a wheel brake may be employed in the device, the brake member 80 being located within the cavity of one or more of the side walls adjacent the rear thereof and in a position to engage the cooperating rear wheel 34. The brake member 80 is preferably mounted upon a member 82 pivoted at 84 to the side wall 14. A rod 86 projects through the flange 18 and mounts a handle 88 at its outer end. The rod 86 is connected with the arm 82 and is adapted to urge the same from a retracted position to brake-engaging position. Coil springs 90 may be employed to hold the rod 86 and the associated brake parts in retracted position. This brake mechanism is optional and need not be employed.

In using the device as a baby carriage, a superstructure in the nature of a collapsible top is desired. Any type of collapsible top found suitable may be employed. One form of such a collapsible superstructure, as illustrated herein, constitutes side panels 92 of rigid construction pivoted at the upper edges of the sides of the carriage by the hinges 94. This side frame preferably constitutes a skeleton frame which mounts transparent panels 96. As best illustrated in Fig. 4, these side panels have upwardly tapering or inclined upper marginal portions 98. The track or guide portions 100 may be carried by the marginal parts 98 of the side panels at their inner surfaces and are adapted to receive flexible slide members 102. These slide members are preferably received in suitable tracks 104 carried by the inner surfaces of the side walls 14 and are slidable longitudinally in said guides 104 and adapted to be extended and to slide into the guides 100 of the top panels 92 when the latter are erected. These slides may be of the character illustrated in Fig. 7 which constitute transverse slats 106 pivotally connected in any suitable manner to render the member 102 flexible. As here shown, the slats 106 are provided with opposed cover panels 108 formed of fabric or any other suitable flexible material, which fabric coverings are secured together at 110 between each of the adjacent slats 106 to control the spacing of said slats and to afford flexing joints between said slats.

Figure 7:
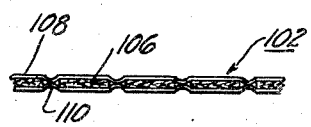
Fig. 7 is an enlarged fragmentary detail sectional view of the cover forming member.
Figure 8:
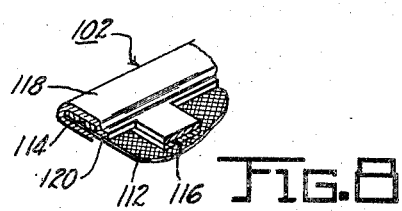
Fig. 8 is a fragmentary perspective view illustrating the structure of a second cover member used in the device.

Alternatively, the construction illustrated in Fig. 8 may be employed, wherein the member 102 constitutes screen members or panels 112 mounted within a flexible frame having longitudinal portions 114 formed of a flexible material, such as thin metal, leather, fabric or the like, and substantially rigid cross frame members 116, the parts being secured together by a flexible fabric or other material 118 extending around each of the members 114 and 116 and secured together at edges 120 to bind the margins of the screen panels 112. Either or both types of members 102 illustrated in Figs. 7 and 8 may be employed and, as illustrated, both such panels are provided. Notice in both instances that the panels 102 are of such character that upon a pulling thereof at a terminal tab portion 122, as shown in Fig. 5, they are moved into the registering ends of the tracks or guides 100 of the panels 92, and may be extended to any desired position along said guides, either to completely span the top or to only partially span the upper top of the cab. Likewise when it is desired to retract the panels 102, it is merely necessary to push endwise thereagainst in a direction to shift said panels out of the guides 100 into the guides 104 carried by the body 10. It will be understood, however, that the superstructure of the carriage as here illustrated is merely illustrative and that any type of collapsible top structure found suitable may be employed.

It is also necessary to provide a closure for the open end of the body 10 at a time when the same is used as a portable container, such as a suitcase. Any releasable closure found suitable may be employed for this purpose. For purposes of illustration, I have shown the carriage body as provided with longitudinal guides 130 extending across the open top portion thereof, said guides being mounted upon the side panels 14 at their inner surface. These guides 130 register with inwardly facing grooves in the side panels 14 defined by the track members 132 which are carried by the inner faces of the side panels 14. A flexible, extensible panel 134, which may be similar to the panel illustrated in Fig. 7, is slidably mounted within the groove provided by the members 132 and is adapted to assume either the retracting position illustrated in Fig. 5, or an extended position completely spanning the open top of the unit, as illustrated in Fig. 1. Here again it will be understood that the construction of panel 134 is illustrative, and that any other type of closure panel found suitable may be employed.

It will be understood that the interior of the body 10 may be provided with suitable padding or upholstering 140, including the upholstered end panel 142 alongside which the shaft 60 extends. If desired, an aperture may be formed in the panel 142 to be closed by a closure panel 144 giving access to the space between the panel 142 and the adjacent end panel 16 for storage purposes. Likewise, if desired, an adjustable head or back rest 146 may be provided as a part of the lining portion of the bottom, which panel may be elevated as shown in Fig. 5, or may be retracted to a position flush with the bottom upholstered panel 140. Any suitable means may be employed to pivot the panel 146 and to hold it in erected position; for example, a strut or brace 148 may be pivotally connected to the free end of the panel 146 and adapted to be received in a socket in the base at its free end to hold it in supporting position.

In order to facilitate use of the device as a portable container, a suitable handle member 150 will be provided at the center of one end wall thereof, which handle may be retractable, if desired, to permit the projection thereof for gripping purposes when the handle is to be used. Also, it will be desirable to provide means for assuring that the closure, such as the closure 134, will be retained in effective cooperative position while being carried, and for this purpose a latch 152 may be provided for holding the closure in its closed position.

The collapsible superstructure and the handle 58 both fit within the body 10 in the closed or Fig. 1 position of the parts. These units will consume some space within the device but will not completely fill the container. Thus there will be space provided in the body 10 for carrying articles as a suitcase. For example, a substantial quantity of infant's clothing and accessories could be carried within the device while the same was in its collapsed position.

In cases where it is not deemed necessary to conceal the wheels and the wheel mounting and positioning structures, the outer panels 22 of the body 10 may be omitted, together with the flanges 18 and spacers 20. This will substantially simplify the construction and take advantage of the feature of wheel collapsibility, it being apparent that the concealment of the wheels is the sole function served by said spacers and panels.

While the preferred embodiment of the invention has been illustrated and described herein, it will be understood that changes may be made in the construction within the scope of the appended claims without departing from the spirit of the invention.

I claim:

1. In a collapsible baby carriage comprising a rigid body including a bottom, side walls and end walls, said side walls including spaced inner and outer panels defining a chamber therebetween, a plurality of wheels, members pivoted to one of said panels and journaling said wheels spaced from their pivot axes, a cross shaft spaced from said wheel journal members and spanning said body adjacent one end thereof with its ends projecting into said chambers, a handle secured to said shaft, cranks carried by said shaft and each positioned in a chamber, links connecting said cranks and wheel journal members and shiftable in said chambers, said wheel journal members having lost motion connection with said links and a latch carried by said body for releasably locking said cross shaft in selected position.

2. A collapsible baby carriage comprising a body including rigid side panels, a rock shaft spanning said body at one end thereof and terminating in end portions projecting from said panels, a handle carried by said shaft, a linkage structure including parts pivoted to said panels and connectors linking said parts spaced from their pivots, said linkage structure being actuated by said shaft upon rotation thereof, a wheel mounted in each pivoted part spaced from the pivot axis of said part, and a latch adapted to releasably lock said shaft and linkage in selected position, said shaft mounting a crank arm at each end, said connectors being pivoted to said crank and being formed of two pivotally connected parts each having a pin and slot connection with a wheel mounting part and springs normally urging said spring and slot connection to one operative position.

3. A collapsible baby carriage comprising a body including rigid side panels, a rock shaft spanning one end of said body and terminating in end portions projecting from said panels, a handle carried by said shaft and shiftable between a position confined within said body, and an operative projected position, means for locking said handle in operative position, a crank arm mounted on the end portions of said shaft, a link unit pivoted to each crank and having a pair of longitudinally spaced slots therein, a pair of wheel mounts pivoted to each panel, a wheel carried by each mount spaced from its pivot, a pin carried by each mount and slidable in a link slot, and a spring urging each pin toward one end of its receiving slot.

4. A collapsible baby carriage comprising a body including rigid side panels, a rock shaft spanning one end of said body and terminating in end portions projecting from said panels, a handle carried by said shaft and shiftable between a position confined within said body, and an operative projective position, means for locking said handle in operative position, a crank arm mounted on the end portions of said shaft, a link unit pivoted to each crank and having a pair of longitudinally spaced slots therein, a pair of wheel mounts pivoted to each panel, a wheel carried by each mount spaced from its pivot, a pin carried by each mount and slidable in a link slot, and a spring urging each pin toward one end of its receiving slot, said link unit including two rigid pivotally connected rigid parts each having one of said slots formed therein.

5. A collapsible baby carriage comprising a body including rigid side panels, a rock shaft spanning one end of said body and terminating in end portions projecting from said panels, a handle carried by said shaft and shiftable between a position confined within said body and an operative projected position, means for locking said handle in operative position, a crank arm mounted on the end portions of said shaft, a link unit pivoted to each crank, a pair of bellcranks pivoted at their central portions to each side panel in longitudinally spaced relation, a slide joint connecting each bellcrank to the adjacent link unit, said slide joints being shiftable longitudinally of said link units between predetermined limits, and a spring urging each slide joint to one of said limits.

JOHN VARGO.

REFERENCES CITED

The following references are of record in the file of this patent:

UNITED STATES PATENTS

| Number | Name | Date |
|---|---|---|
| 924,008 | Smith | June 8, 1909 |
| 1,125,441 | Bailey | Jan. 19, 1915 |

FOREIGN PATENTS

| Number | Country | Date |
|---|---|---|
| 238,409 | Great Britain | Aug. 20, 1925 |